United States Patent [19]
de Boer

[11] Patent Number: 6,041,663
[45] Date of Patent: Mar. 28, 2000

[54] METHOD AND DEVICE FOR DETERMINING THE FLOW VELOCITY AND/OR THROUGHPUT OF A FLOWING FLUID

[75] Inventor: Geeuwke de Boer, Veenendaal, Netherlands

[73] Assignee: Instromet Ultrasonics B.V., Dordrecht, Netherlands

[21] Appl. No.: 09/042,935

[22] Filed: Mar. 17, 1998

[51] Int. Cl.[7] ....................................... G01F 1/66
[52] U.S. Cl. ..................... 73/861.28; 73/861.27; 73/861.29
[58] Field of Search ................ 73/861.18, 861.26, 73/861.27, 861.28, 861.31

[56] References Cited

U.S. PATENT DOCUMENTS

| | | |
|---|---|---|
| 4,102,186 | 7/1978 | Brown . |
| 4,610,167 | 9/1986 | McShane . |
| 5,546,812 | 8/1996 | Drenthen ............................ 73/861.28 |

FOREIGN PATENT DOCUMENTS 0639776  2/1995  European Pat. Off. .

*Primary Examiner*—Harshad Patel
*Attorney, Agent, or Firm*—Jones, Day, Reavis & Pogue

[57] ABSTRACT

In the case of the ultrasonic measuring method and measuring device for determining the flow velocity and/or throughput of a flowing fluid in a channel according to the invention paths are used, of which at least one first path passes through the centre of the channel, and at least one second path is in the form of an inscribed triangle, and at least one third path has three or more reflections against the wall of the channel.

7 Claims, 5 Drawing Sheets ure US 6,041,663

METHOD AND DEVICE FOR DETERMINING THE FLOW VELOCITY AND/OR THROUGHPUT OF A FLOWING FLUID

Method and device for determining the flow velocity and/or throughput of a flowing fluid

TECHNICAL FIELD OF THE INVENTION

The invention relates to a method for determining the flow velocity and/or throughput of a flowing fluid in a channel, by transmitting and receiving ultrasonic sound waves along paths between transducers which are disposed along the periphery of the channel and can act as transmitter and receiver, measuring the transit times of the sound waves transmitted in opposite directions along a path, and determining the difference between the transit times thereof and calculating the flow velocity and/or throughput using multiplication factors, at least one path being situated between two transducers positioned at a distance from each other in the direction of flow of the fluid.

PRIOR ART

Such a method is known from, for example, Applicant's European Patent Application 0,639,776. This known method is based on the recognition of certain characteristics of the flow profile—symmetry, swirl and/or pulsating flow—and on the basis thereof automatically adjusting the multiplication factors, in order to calculate the throughput and/or flow velocity from the measured transit times. In a preferred embodiment of this known method pairs of transducers are used, said transducers being disposed in such a way that the paths thereof comprise three paths through the centre of the channel with single reflection against the wall and two paths according to an inscribed triangle.

For the carrying out of measurements, such as those in the case of gas producers, the requirements as regards accuracy and reliability of the measured results are becoming increasingly strict. One of the causes of the "inaccuracy" and "unreliability"—insofar as such terms can be used—of the results obtained by known methods is the residual sensitivity to different flow profiles, which is caused, inter alia, by the position of the acoustic paths, and thus of the assigned multiplication factors.

OBJECTS OF THE INVENTION

One object of the invention is to provide a measuring method in which the basic sensitivity to axially symmetrical flow patterns is reduced and the flow profile need not be recognized.

A further object of the invention is to provide such a measuring method on the basis of a suitable choice of the arrangement of the transducers, and thus of the paths.

Yet another object of the invention is to improve the accuracy and reliability of the measuring method, and consequently of the measured results obtained by it.

SUMMARY OF THE INVENTION

This object is achieved according to the invention by a method of the abovementioned type, in which the paths comprise at least one first path through the centre of the channel, and at least one second path in the form of an inscribed triangle, and at least one third path with three or more reflections against the wall of the channel.

A path, also called an acoustic path below, is the route between the transducers concerned, irrespective of the direction in which the transmitted sound waves pass along said path.

In the case of the method according to the invention, sound waves are therefore transmitted along at least three different acoustic paths, a path through the centre of the channel, a path in the form of an inscribed triangle, and a path with more than two reflections against the wall of the channel. Along each path the sound waves are transmitted in both directions, so that the flow velocity and/or the throughput can be calculated by means of the difference in transit time of the sound waves transmitted in opposite directions.

By means of this combination of acoustic paths, the mathematical multiplication factors to be assigned can be made equal for all kinds of axially symmetrical flow profiles, irrespective of the prevailing flow profile.

In practice, if it is considered necessary, a combination of the method according to this invention with the method described above according to EP-A-0,639,776 can be used.

As will emerge below, the results obtained by the method according to the invention are better, and thus more reliable, than the results achieved until now.

Preferred embodiments of the method according to the invention are defined in the subclaims. The first path through the centre of the channel preferably comprises one reflection against the channel wall, because such a path is insensitive to swirl. Moreover, the third path with the most reflections is preferably an inscribed square, so that the total path length has little effect on the accuracy of the measurement, which can be reduced as a result of absorption of the sound waves by the medium.

The invention also relates to a device for determining the flow velocity and/or throughput of a flowing fluid in a channel, which device comprises pairs of transducers which are disposed along the periphery of the channel and can act as transmitter and receiver, of which at least one pair of transducers are situated at a distance from each other in the direction of flow of the fluid, and also comprises means connected to the transducers for determining the flow velocity of the fluid in the channel from the corresponding transit times of the acoustic waves between the pairs of transducers. Such a device is also known in the art, for example from the abovementioned European Patent Publication 0,639,776.

The device according to the invention is characterized in that the pairs of transducers are disposed in such a way that they comprise at least one first path through the centre of the channel, and at least one second path in the form of an inscribed triangle, and at least one third path with three or more reflections against the wall of the channel.

DESCRIPTION OF THE DRAWINGS

Preferred embodiments of the device according to the invention are described.

The invention will be illustrated in greater detail below with reference to the appended drawing, in which.

It is pointed out that the term weighting factor is intended to convey the geometrical weighting factor, in order to distinguish it from the arithmetical multiplication factors which are used as correction factors when calculating the velocities and/or the throughput of the medium.

The invention is based on the following principles. For determining the flow through a cylindrical channel the surface area of a cross-section through the channel is divided into a series of concentric rings. Each ring has a surface area of $2\pi r.\delta r$, $\delta r$ being the width of the concentric ring. The surface area of a ring therefore increases in direct proportion to the value of r. See curve 1 in FIG. 1, which shows the relative contribution of a ring as a function of the radius.

Figure 1:
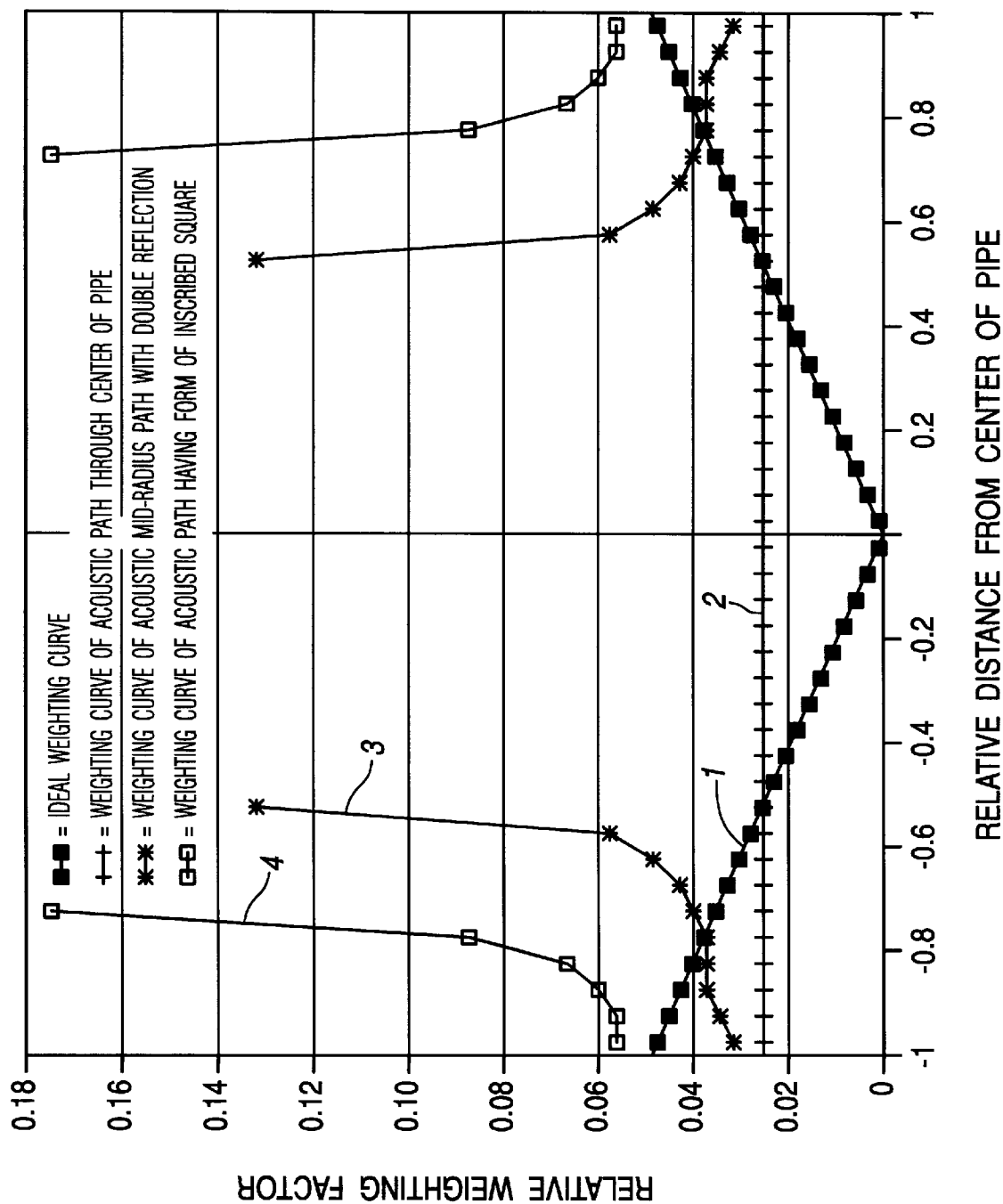
FIG. 1 is a graph of the weighting factors for various acoustic paths.

For an axially symmetrical flow the volume Q flowing through the pipe can be found by adding or integrating the velocity V(r), multiplied by the surface area of the corresponding concentric ring, or in formula form: $Q=\int V(r).2\pi r.\delta r$. The magnitude of the velocity V(r) is determined by the ultrasonic measuring device. The multiplication factor to be assigned depends on the position of the acoustic path. In addition to the ideal weighting curve 1 to be achieved, FIG. 1 shows the weighting factors for three different paths. In the case of an acoustic path through the centre of the pipe, each segment with a width frequency has the same weighting factor, as indicated by curve 2 in this figure. Curve 3 shows the weighting factor of an acoustic path in the form of an inscribed triangle (mid-radius path with double reflection). Curve 4 corresponds to the weighting factors of a path in the form of an inscribed square.

Figure 2:
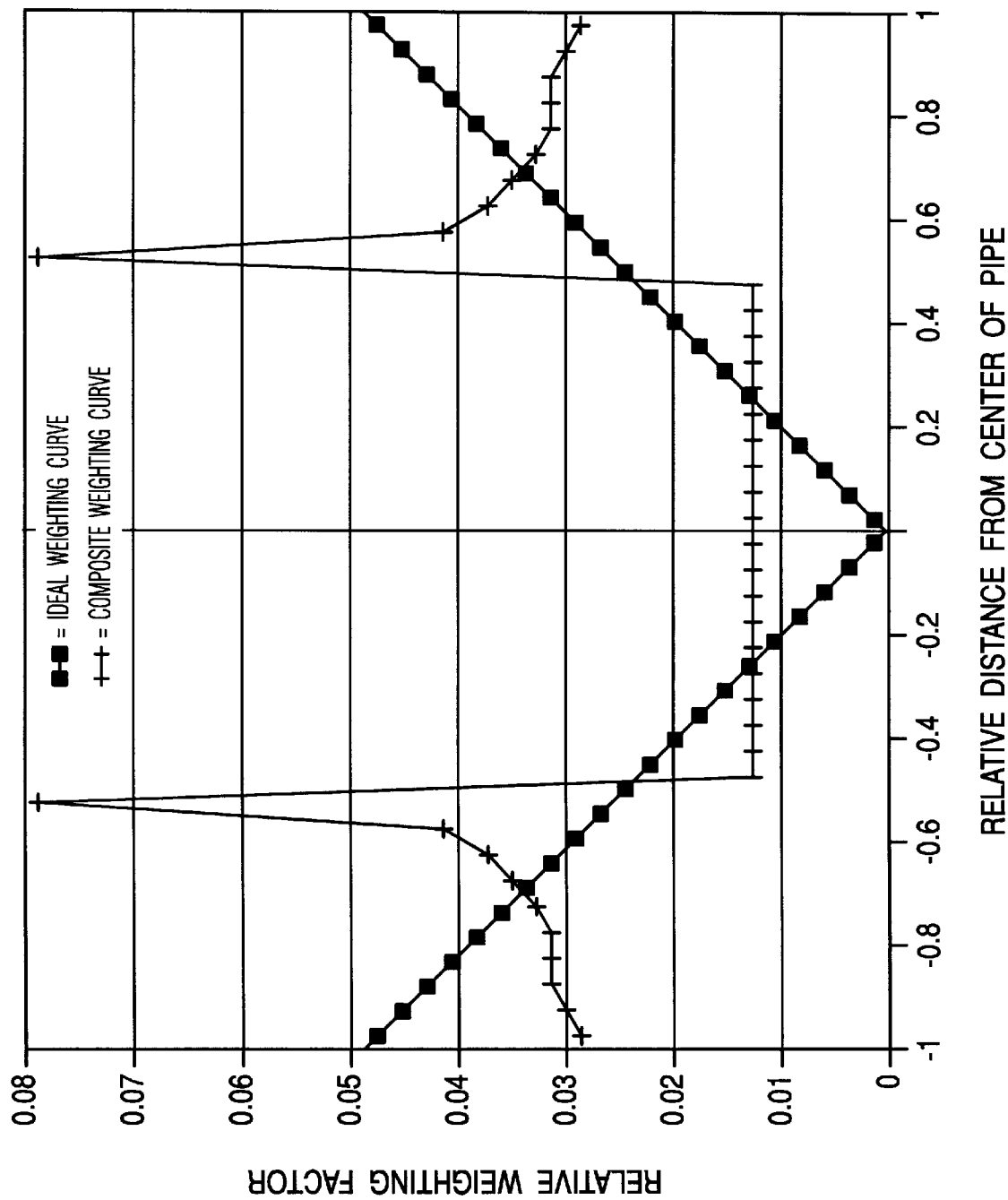
FIG. 2 is a graph of the weighting factors for an ideal acoustic path compared with that for a combination of acoustic paths according to the prior art.
Figure 3:
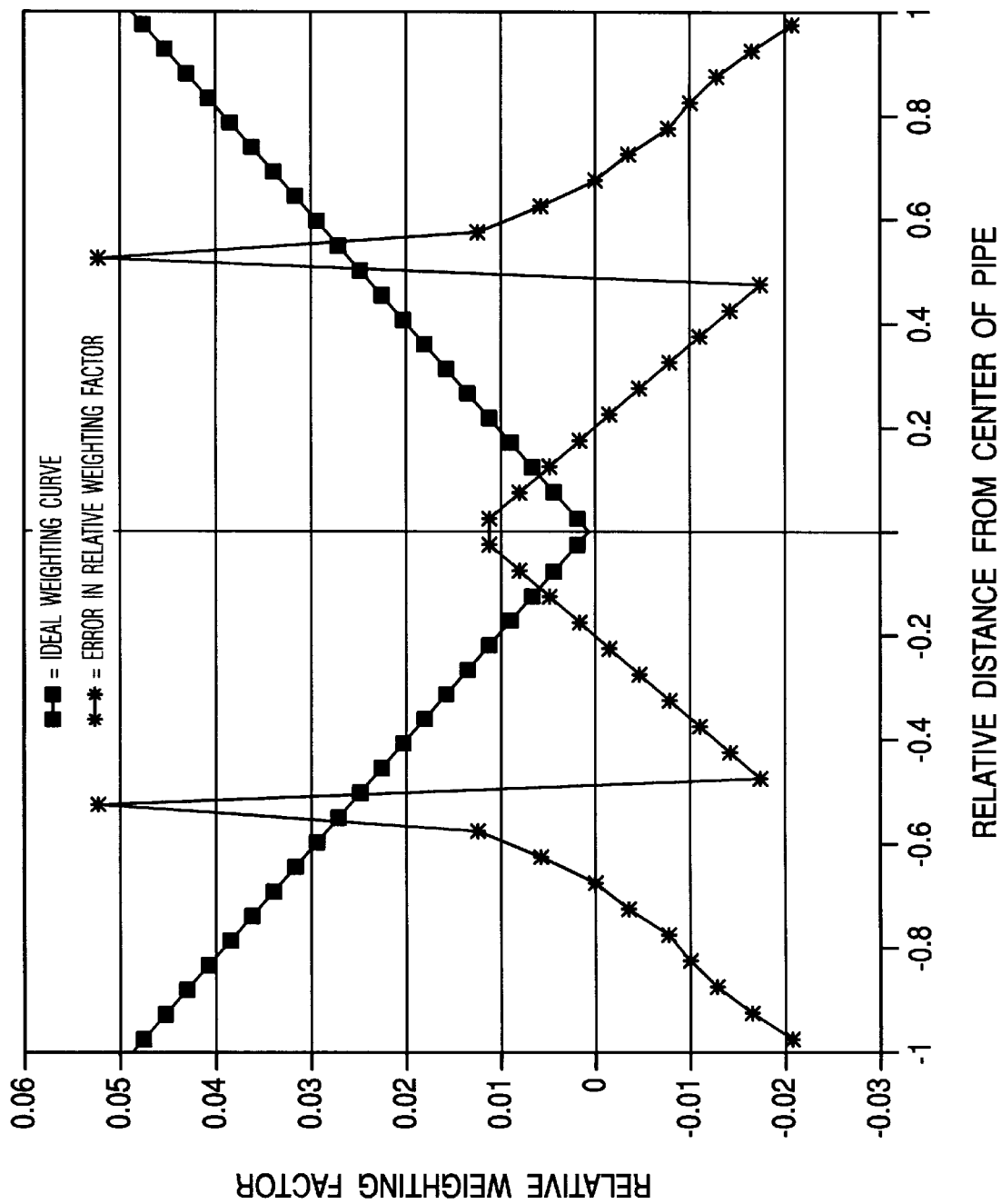
FIG. 3 is a graph of the residual error of the combination according to FIG. 2.

FIG. 2 shows the ideal weighting curve (■) and the composite weighting curve (+) of a combination of a single reflection path with a double reflection path, as known from the prior art. FIG. 3 shows the relative measuring error (*) thereof (weighting curve minus ideal weighting curve) as a function of the position. It can be seen from this that weighting errors occur, varying from approximately −0.02 to +0.054. Such weighting errors in turn lead to measuring errors if the actual flow profile differs from the flow profile which was present during calibration or from what was expected.

Figure 4:
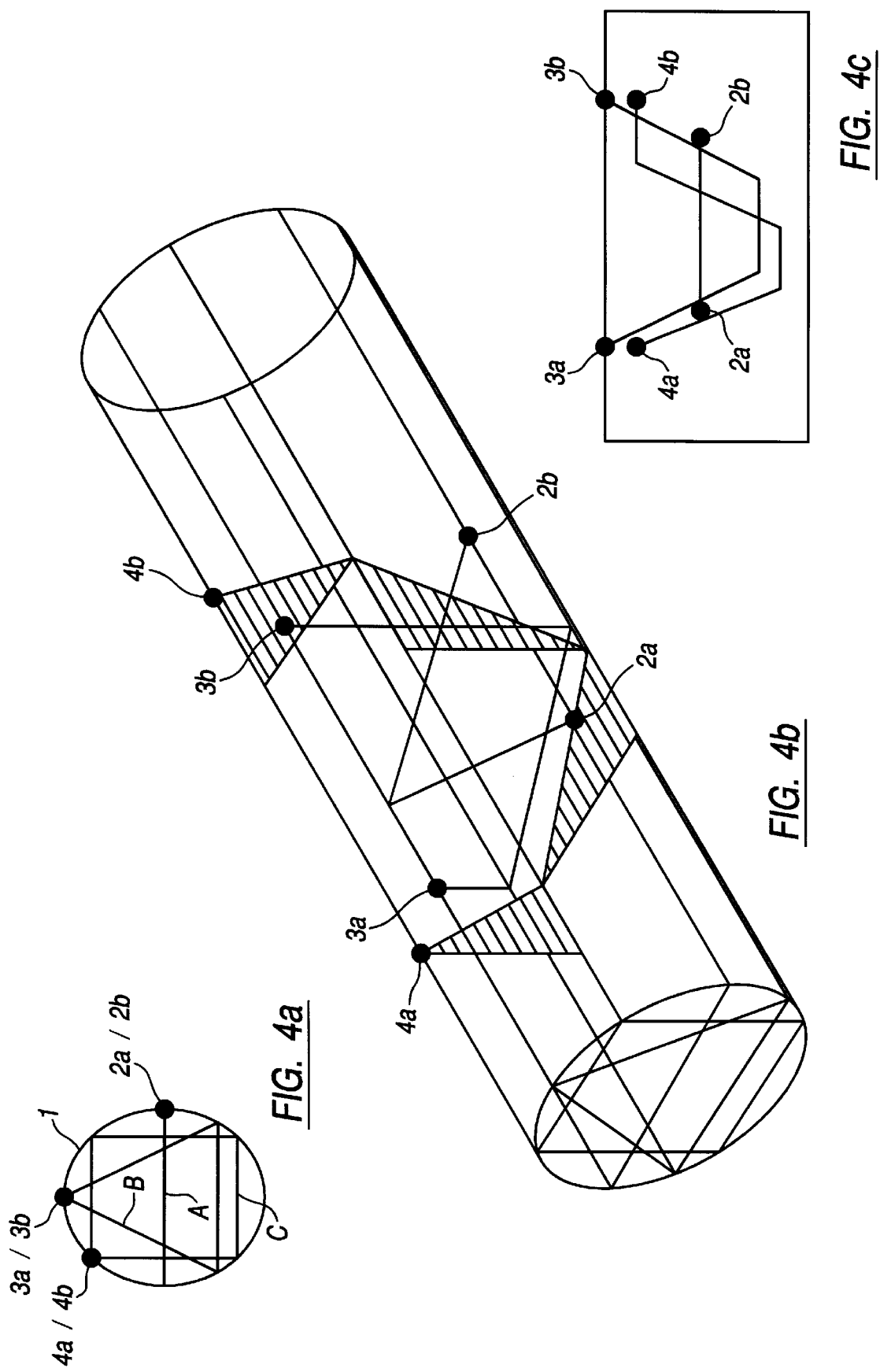
FIGS. 4a and 4b are diagramatic illustrations of a preferred embodiment of configurations of transducers and acoustic paths in a channel which is used in the case of the present invention.
FIG. 4c is a diagramatic illustration showing a projection of the acoustic paths as seen from a direction perpendicular to the longitudinal axis of the channel.

FIGS. 4a and 4b show a preferred embodiment of the arrangement of transducers and thus acoustic paths which is used in the case of the method and device according to the invention. Pairs of transducers are disposed along the periphery of a channel 1. A first pair of transducers 2a, 2b is situated at a distance from each other in the lengthwise direction of the channel. These transducers define a first acoustic path A with a single reflection against the wall of the channel 1. In a comparable manner, a second pair of transducers 3a, 3b is disposed in such a way that the second acoustic path B is in the form of an inscribed triangle. A third pair of transducers 4a, 4b is disposed in such a way that the third acoustic path C thereof is in the form of an inscribed square. FIG. 4c shows a projection of the acoustic paths, seen from a direction perpendicular to the longitudinal axis of the channel 1.

With the combination of acoustic paths according to the invention, a curve of composite weighting factors coming as close as possible to the ideal weighting curve is now obtained.

Figure 5:
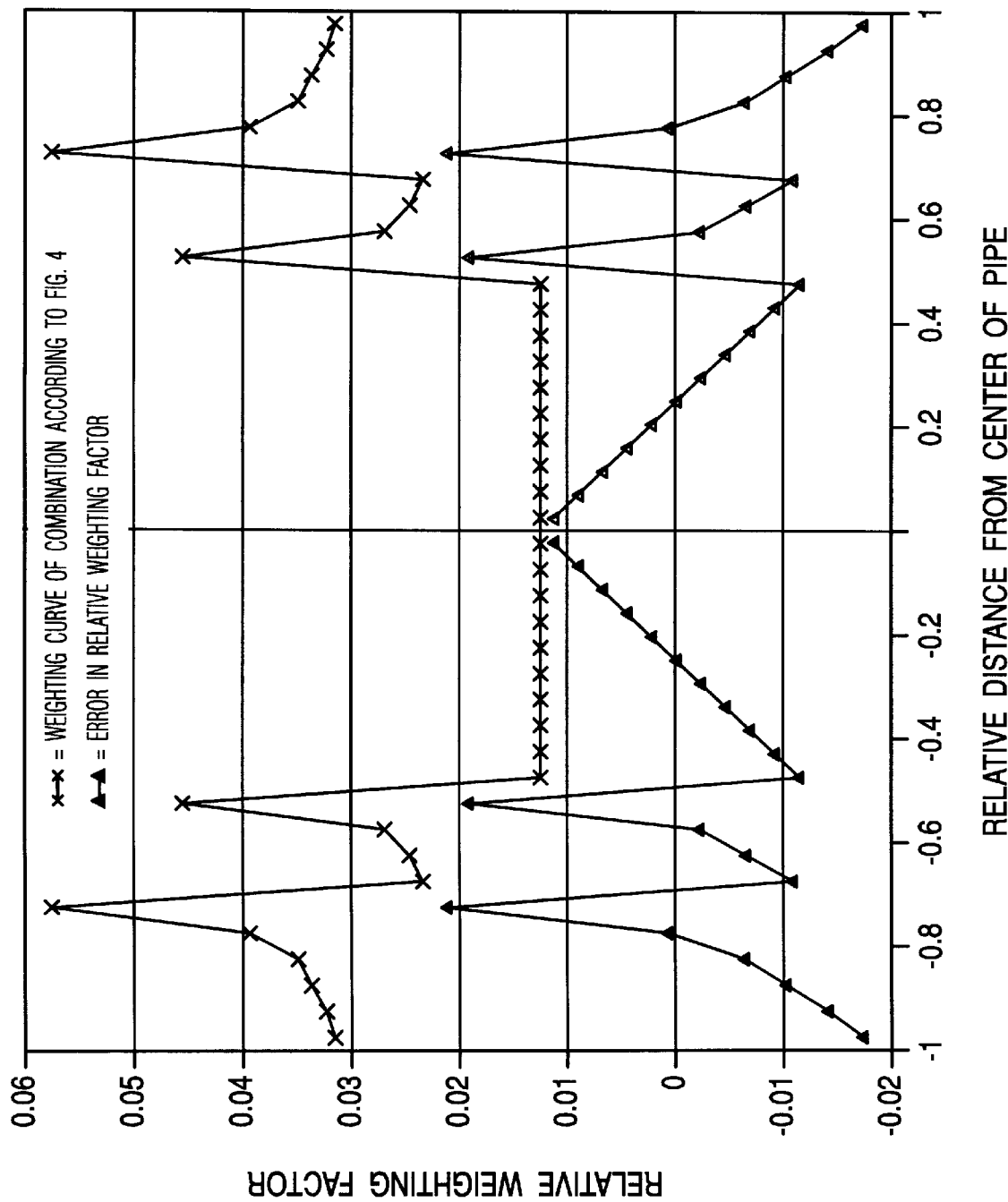
FIG. 5 is a graph of the weighting factors and residual error for the combination of acoustic paths according to FIG. 4.

FIG. 5 shows the weighting curve (x) of this combination, and the residual error thereof, indicated by ▲, relative to the ideal weighting curve (not shown). As can be seen from this figure, the error in this case remains within the −0.02 and +0.02 range, which means a considerable improvement compared with the known combination. Another advantage is that the peaks in the residual error are distributed better over the space (cf. the single peak in curve 2 of FIG. 3 with the double peak in the residual error according to FIG. 5). The sensitivity to a local profile disturbance is reduced as a result.

With the measuring technology existing until now, an inaccuracy of approximately 0.5% can be achieved, caused by (metastable) variations in the flow profile. In the case of the measuring method according to the present invention, this can at least be reduced to about 0.15%.

What is claimed is:

1. Method for determining the flow velocity and throughput of a flowing fluid in a channel, by transmitting and receiving ultrasonic sound waves along a plurality of paths between transducers which are disposed along the periphery of the channel and act as transmitters and receivers, measuring the transit times of the sound waves transmitted in opposite directions along each of said paths, and determining the difference between the transit times thereof and calculating the flow velocity and throughput using multiplication factors, at least three paths being situated between two transducers for each path positioned at a distance from each other in the direction of flow of the fluid, wherein the paths comprise at least one first path through the centre of the channel, and at least one second path in the form of an inscribed triangle, and at least one third path with three or more reflections against the wall of the channel.

2. Method according to claim 1, wherein said at least one first path comprises one reflection against the wall of the channel.

3. Method according to claim 1, wherein said at least one third path is in the form of an inscribed square.

4. Method according to claim 1, wherein multiplication factors which depend on the position of the path concerned are predetermined.

5. Device for determining the flow velocity and throughput of a flowing fluid in a channel, which device comprises pairs of transducers which are disposed along the periphery of the channel and act as transmitters and receivers, respectively, of which at least one pair of transducers is situated at a distance from each other in the direction of flow of the fluid, and also comprises means connected to the transducers for determining the flow velocity of the fluid in the channel from the corresponding transit times of the acoustic waves between the pairs of transducers, wherein the pairs of transducers are disposed in such a way that they comprise at least one first path through the centre of the channel, and at least one second path in the firm of an inscribed triangle, and at least one third path with three or more reflections against the wall of the channel.

6. Device according to claim 5, wherein said at least one pair of transducers is disposed in such a way that said at least one first path has one reflection against the wall of the channel.

7. Device according to claim 5, wherein said at least one pair of transducers is disposed in such a way that said at least one third path is in the form of an inscribed square.

* * * * *